United States Patent
Weidenbenner et al.

[11] 3,908,064
[45] Sept. 23, 1975

[54] HEAT TRANSFER COMPOSITION TAPE

[75] Inventors: William A. Weidenbenner, Dallas, Tex.; Irvin J. Steltz, North Wales, Pa.

[73] Assignee: Amchem Products, Inc., Ambler, Pa.

[22] Filed: Apr. 30, 1973

[21] Appl. No.: 355,839

Related U.S. Application Data

[63] Continuation-in-part of Ser. No. 258,277, May 31, 1972, abandoned.

[52] U.S. Cl. .............. 428/323; 252/74; 252/75; 260/42.22; 260/42.28; 260/42.46; 260/42.47; 260/836; 260/837 R; 428/328; 428/914
[51] Int. Cl.² ..... B32B 7/10; B32B 5/16; B32B 7/06
[58] Field of Search ............ 117/3.4; 161/406, 162; 252/75, 74; 260/837 R, 836, 41 A, 41 R, 41.5 A, 41.5 R, 42.28

[56] References Cited
UNITED STATES PATENTS

| | | |
|---|---|---|
| 3,359,127 | 12/1967 | Meyer et al.......................... 117/3.4 |
| 3,483,020 | 12/1969 | Giellerup.......................... 117/3.4 X |
| 3,666,516 | 5/1972 | Dunning .............................. 117/3.4 |
| 3,674,893 | 7/1972 | Nowak et al............... 260/837 R X |
| 3,708,379 | 1/1973 | Flint................................ 161/406 X |

*Primary Examiner*—Charles E. Van Horn
*Assistant Examiner*—Thomas Bokan
*Attorney, Agent, or Firm*—Ernest G. Szoke; Howard S. Katzoff; Michael E. Zall

[57] ABSTRACT

A heat transfer composition in preshaped, tape form comprising an elongate extrusion consisting essentially of an epoxy resin, dicyandiamide curing agent therefor, nitrile rubber, polybutene, particulate heat transfer coefficient-increasing filler and asbestos, the elongate extrusion being strippably adhered to a release backing sheet.

18 Claims, 4 Drawing Figures

INVENTOR
WILLIAM A. WEIDENBENNER
IRVIN J. STELTZ
BY
ATTORNEY

HEAT TRANSFER COMPOSITION TAPE

BACKGROUND OF THE INVENTION

This is a continuation-in-part of U.S. application Ser. No. 258,277 filed on May 31, 1972 now abandoned.

In the petrochemical industries, large quantities of fluids are transferred through piping. Often these fluids must be maintained at temperatures above ambient to avoid freezing or to prevent undue increase in viscosity. One common means of maintaining the desired temperature conditions in the pipeline is to supply enough heat energy to balance the heat losses by means of a heat-supplying "tracing," mechanically fastened to the piping. The tracing may be a tube through which a hot fluid, like water, mineral oil or steam, is passed or it may be a cable of resistance wires enclosed in a metal jacket.

The inherent fault in tracing systems is the limited contact, which is essentially only a narrow line, between the tracing and the pipeline. Thus, it is accepted practice to fill the open space at both sides of the juncture between tracing and pipeline with a putty-or-paste-like composition having a thermal conductivity significantly higher than air. This technique increases the rate of heat flow between the heat source (tracing) and the pipeline by displacing the low conductivity air space with higher conductivity paste, eliminating both "skin" and space resistances to heat flow and by increasing the area of pipe surface in thermal contact with tracing surface through the conducting medium of the paste.

A number of such "heat transfer" compositions have been marketed. Usually they are composed of a finely-divided, solid heat-conducting substance, such as graphite, metals or metal compounds, dispersed in a plastic binder to a paste-like consistency and intended to be applied by trowelling, knifing or caulking apparatus or as a prefabricated applicator (see, for example, U.S. Pat. Nos. 3,331,946 and 2,982,992). Some of these pastes contain significant quantities of volatile materials which, after application, evaporate causing shrinkage which often results in loss of adhesion and air gaps. A common paste of this type employed sodium silicate as binder and contained a substantial proportion of water. Other pastes contain heat-reactive organic binders, such as epoxy resins or polybutene, which, unless low temperature storage is resorted to, cause a gradual increase in viscosity, often resulting, upon prolonged storage, in a material unfit for use.

One class of commercially available heat-reactive heat transfer pastes is composed of graphite and other fillers dispersed in a reactive epoxy resin medium. Such pastes, although considerably more costly than the sodium silicate-base type, contain virtually no volatile ingredients, so that no shrinkage occurs upon curing. They are not sensitive to water, as is the sodium silicate-base type, and so do not need protection from rain or snow. They bond strongly to clean surfaces, without meticulous surface preparation, and they are not destroyed by rapid heating. These are the mixtures which, however, have limited stability because of their reactive ingredients. They are applied by manual methods, usually with trowels or caulking guns, with the attendant disadvantages, including equipment costs, especially in the case of compressed air-operated caulking guns, waste or inadequate application through non-uniform manual operation and waste through residual paste remaining in containers and on tools. Attempts to form preshaped tape-like products through extrusion of these epoxy-base compositions, as well as of the sodium silicate-type, were not successful.

It is the principal object of the present invention to provide a heat transfer material, especially adapted for high temperature use, which nevertheless reduces or eliminates the disadvantages, the principal of which are referred to above, of previously available heat transfer compositions.

This and other objects will become apparent from a consideration of the following specification and claims.

SUMMARY OF THE INVENTION

The heat transfer product of the present invention is in the form of a heat curing plastic elongate extrusion or ribbon strippably adhered to a backing release sheet, the plastic material being an intimate mixture consiting essentially of: particulate solids having a thermal conductivity of at least about 100 Btu, inch/hr, sq. ft., deg. F in an amount of from about 15 to about 60 percent; epoxy resin in an amount from about 15 to about 40 percent; dicyandiamide in amount of from about 1 to about 15 parts per hundred epoxy resin; nitrile rubber in an amount of from about 2 to about 15 percent; polybutene in an amount of from about 2 to about 15 percent; and asbestos fiber in an amount of from about 3 to about 10 percent, said percentages being by weight based upon the weight of the composition.

By the term "plastic" herein, we mean that which is capable of being molded, modeled, or deformed in any direction without rupture.

THE PREFERRED EMBODIMENTS

Figure 1:
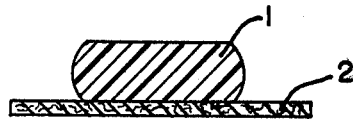
FIG. 1 is an end elevational view, in section, and somewhat enlarged, illustrating the cross section of the tape-like product of this invention.

The product of the present invention is a shaped, preformed plastically deformable composition in the form of a continuous extrusion or ribbon. The term "ribbon" is used generically without regard to the product's cross-sectional shape, which may take a wide variety of forms. In the process of extrusion, the composition is applied to a releasable backing sheet, slightly wider than the ribbon, which serves to permit the somewhat sticky composition to be coiled or rolled upon itself without sticking or fusing together in the package and allowing it to be unrolled readily for use and to provide a low-friction-bearing surface beneath which the shaped composition may be pressed into position by finger or by tool without sticking or tearing. Further advantages of this product are many. There is no investment required in caulking guns, air compressor or other costly application equipment. Since the composition is uniform in cross section throughout its length and pre-measured quantities of it may be used, there is no waste due to excessive application or loss of effectiveness due to inadequate application, as often occurs in manual use of bulk materials. Likewise, there is no waste due to loss of material remaining in containers or on tools. The material is not reactive at ordinary temperatures, so that refrigerated storage is not required. The product is readily applied to any shape or contour of piping, even in congested spaces or where the application surface cannot be seen (as below or behind piping). The product can be packaged in unit lengths corresponding to lengths of piping, so that there is not required calculation or conversion from units of volume to units of length in estimating quantities. The composition is non-volatile and thus does not shrink on curing or require time for evaporation of volatiles before heat may be applied. The material is not soluble in water, so that applications made out of doors need not be specially protected from rain or snow during the construction period.

Because synthetic resins and plastics have relatively low thermal conductivity — generally below 10 Btu, inch/hr, sq. ft., deg. F — the heat transfer composition will have dispersed therein a substantial portion of a particulate (finely-divided) solid having a significant thermal conductivity. Advantageously, the thermal conductivity is at least 100. Such materials include metals, like copper, aluminum, and the various irons and steels; metal compounds, like zirconium carbide; graphite; and mixtures of these. Of these, graphite is particularly preferred, especially electrode grade graphite. The preferred proportion of particulate heat transfer filler in the present composition is from about 35 to about 45 percent.

When optimum packing density of particulate heat transfer filler is desired, the filler may be size graded; that is, it may be a combination of relatively coarse and of relatively fine particles. By "relatively coarse" is meant substantially all through 20 mesh but less than 25 percent through 200 mesh, and by "relatively fine" is meant more than 75 percent through 200 mesh. The relatively coarse particulate filler may make up from about 5 to about 40, preferably from about 10 to about 20 percent of the composition and the relatively fine material may make up from about 5 to about 40, preferably from about 20 to about 30 percent of the composition (the total being within the ranges hereinabove set forth for total particulate heat transfer filler).

The principal binding agent of the present composition is an epoxy resin, that is a resin containing terminal epoxide groups

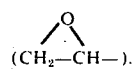

Such resins are prepared by reacting a haloepoxyalkane, most usually epichlorhydrin, with a polyhydric alcohol, such as diphenylolpropane (bisphenol A), tetrahydroxyphenol ethane, novalak resins, and the like. The preferred epoxy resin is a liquid reaction product of epichlorhydrin and bisphenol A. Liquid epoxy resins have epoxide equivalents ranging from about 140 to about 750 (grams of resin containing one gram-equivalent of epoxide). The preferred epoxy resins have epoxide equivalents ranging from about 180 to about 200. The preferred range of proportions for the epoxy resin in the present composition is from about 25 to about 30 percent.

The dicyandiamide is present as a high temperature curing agent for the epoxy resin. The dicyandiamide is completely inactive in the present compositions at temperatures below 180°F., so that the composition has unlimited storage or package life at ordinary temperatures. However, after application, heating, either externally or through the tracing itself, causes the dicyandiamide to become effective, cross-linking the epoxy resin and converting the originally somewhat tacky, soft deformable composition to a tough, hard material. The preferred amount of dicyandiamide used in the present composition is from about 4 to about 6 phr (parts per hundred parts epoxy resin).

Nitrile rubber and polybutene are also present in the composition of this invention. Neither of these materials is considered to be compatible with epoxy resin in the amounts used herein, nevertheless, it has been found that these two materials can be successfully combined with the epoxy resin to provide a material with the proper lubricity to be extruded, the proper tackiness to adhere to the strippable backing sheet and to the pipeline and tracing, and the proper flexibility and deformability to be wound as a coil and to be pushed into the crevice at the juncture between pipeline and tracing.

nitrile rubber is a copolymer of butadiene and acrylonitrile and is also known as Buna N and NBR. The acrylonitrile content in the copolymers ranges from about 20 to about 50 percent, with a preferred acrylonitrile content, for purposes of the present composition, of from about 30 about 35 percent. The preferred range of proportions for the nitrile rubber is from about 5 to about 10 percent.

Polybutene is a polymer of a monoolefin (or mixtures thereof) containing four carbon atoms, such as isobutylene, butene-1 and butene-2. The polymer may be a polymer of a pure compound or of mixtures, such as unsaturated four carbon atom fractions resulting from petroleum distillation. The preferred polybutenes for use in the present composition are those having molecular weights of from about 300 to about 15,000. The preferred range of proportions for the polybutene is from about 10 to about 15 percent.

Asbestos fiber is also included in the present composition. This material helps to control the cold flow of the composition in the package and after application to the juncture between tracing and pipeline. The preferred asbestos fiber is chrysotile, particularly milled to grade 7 (Quebec Asbestos Mining Association), and especially 7 R. The preferred range of proportions for the asbestor fiber is from about 4 to about 8 percent.

In preparing the composition from the above-discussed components, the materials are mixed together following conventional mixing techniques involving solids and liquids. A sigma blade mixer has been found to be particularly suitable with incremental additions of liquid materials (epoxy resin and polybutene) and of solids (nitrile rubber, particulate heat transfer filler, asbestos and dicyandiamide) to maintain a doughy consistency. The mixing operation generates heat and at the time the dicyandiamide is added, preferably at the end of the mixing operation, and thereafter until used, the temperature of the mass should not exceed 180°F.

The resulting stiff, doughy mass is extruded, through a die having the desired cross-sectional configuration, onto a moving strip of release backing sheet. The backing sheet will be pliant to enable the resulting tape-like structure to be wound about itself and to be easily bent for handling and application. Although the composition will superficially stick to the backing sheet, the latter will readily strip or separate from the ribbon of composition by simple manual force to enable the tape to be unwound and to enable the backing sheet to be peeled from the composition after the latter has been applied. Alternatively, the backing sheet can remain in place during heat curing and can be stripped thereafter. This is a particular advantage of the present invention when it is desirable to have the backing sheet in place temporarily in order to protect the applied composition from damage.

Commercially available release paper has been found to be highly suitable as backing release sheets, and such papers are usually kraft (bleached or unbleached), glassine or parchment which has been treated with a silicone release agent. For heavy duty use and handling, the paper preferably has a basis weight of at least 60 pounds per ream (500 sheets, 24 × 36 inches).

Reference is made herein to the composition consisting essentially of the stated components. This is not to be construed as excluding minor amounts of other materials which do not materially detract from the novel characteristics of the herein-described composition.

Figure 2:
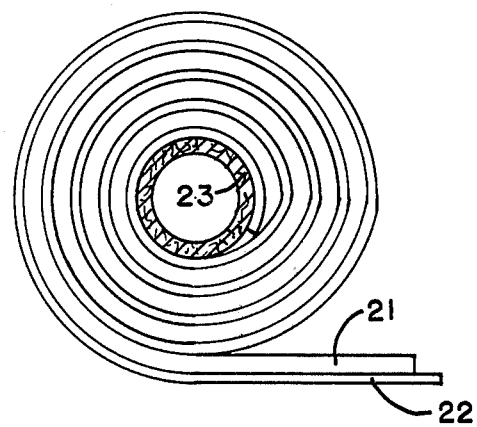
FIG. 2 is a side elevational view illustrating the winding of the tape in the form of a coil for ease in storage and handling.

Referring then to the drawings, FIG. 1 shows ribbon of heat transfer composition, 1, strippably adhered to backing release sheet 2. The sides of ribbon 1 may appear slightly convex, as shown, due to pressure flow when the tape is wound as a flat coil. FIG. 2 shows, in a side elevational view, the present tape composed of ribbon of heat transfer composition, 21, on backing release sheet, 22, wound about itself as a flat coil for ease in packaging and utilization. A hollow paperboard mandrel core, 23, may be used.

Figure 4:
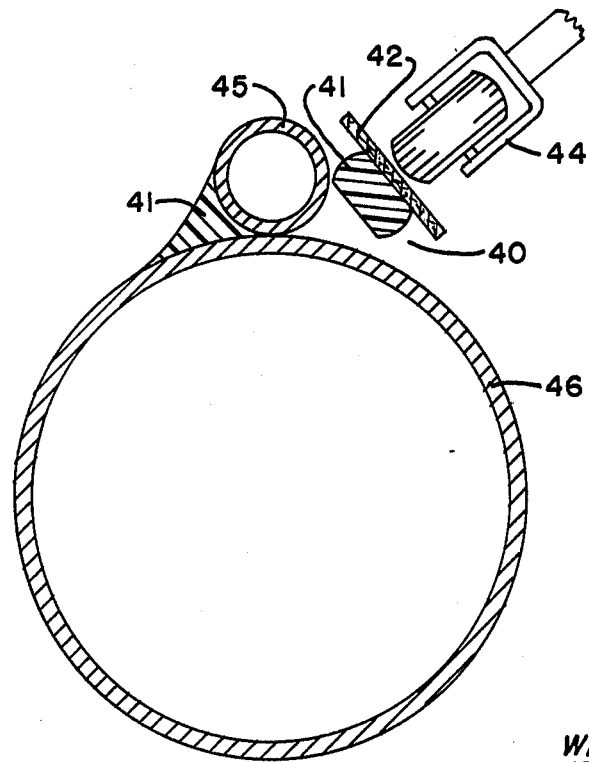
FIG. 4 is an end elevation in section, illustrating application of the present composition.

FIG. 4 illustrates application of the tape by means of a hand tool. Tape 40, consisting of ribbon heat transfer composition, 41, on backing release sheet 42 is about to be pressed, by means of manually operated roller 44, into the crevice at the juncture between tracing 45 and pipeline 46. Tracing 45 is mechanically attached to pipeline 46 by conventional means, such as bands (not shown). The crevice at the opposite side of the juncture has already been filled with heat transfer composition 41 and its backing sheet peeled away.

It should be understood that other suitable methods of application can be effected. For example, a conformably shaped ribbon of heat transfer composition adhered to a backing release sheet can be applied to the pipe surface, the backing release sheet can be stripped, and thereafter the tracing can be laid onto the heat transfer composition and mechanically fastened to the pipe, so that the heat transfer composition is positioned into the crevice at the juncture between the tracing and the pipeline.

Supplying heat to the tracing, as by passing hot fluid, or electric current, in the case of resistance elements, therethrough to raise the temperature of the heat transfer element about 180° F. causes the dicyandiamide to become active to cross-link the epoxy resin and thus to cure the mass into a hard, tough body adherent to the tracing and pipeline.

Figure 3:
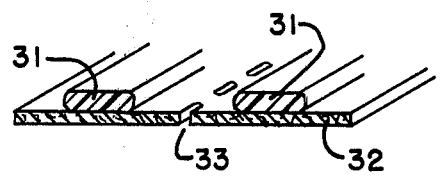
FIG. 3 is a perspective view, in section, showing an alternate embodiment of the invention.

FIG. 3 illustrates an embodiment of the invention in which two ribbons of heat composition 31, are extruded in spaced parallel parallel relation on a single backage release sheet 32. The space between each ribbon 31 will be such that when the double tape is placed over the tracing, a ribbon will be in juxtaposition with the space to be filled at each side of the juncture between tracing and pipeline. Removal of the backing sheet 32, if desired after application, is facilitated by the provision of perforations 33 parallel to and equidistant from ribbon 31.

The following example is given further to illustrate the present invention and is not intended to limit the scope of the invention in any way.

The following materials in the stated proportions (%, by weight, based on the weight of the entire composition) are used:

| Component | %, by wt. |
|---|---|
| Epoxy resin (epoxide equivalent of 185–195, from epichlorhydrin and bisphenol A) | 28.51 |
| Nitrile rubber crumbs (medium high acrylonitrile content) | 7.89 |
| Graphite (electrode grade, 1% on 20 mesh, 20% through 200 mesh) | 16.45 |
| Graphite (electrode grade, 1% on 100 mesh, 82% through 200 mesh) | 27.41 |
| Polybutene (m.w. 1900–2500, viscosity at 210° F. 14,660 ssu) | 12.72 |
| Asbestos fiber (7 R chrysotile) | 5.92 |
| Dicyandiamide | 1.10 |

The foregoing materials are mixed in a sigma blade mixer with incremental additions of components selected between liquid (epoxy resin and polybutene) and solids to maintain a doughy consistency. The dicyandiamide is added last after the temperature of the mixture has been checked to insure it being not over 180° F., and care being taken that the temperature of the mixture not rise above 180° F. during mixing in of the dicyandiamide.

The doughy mixture is then extruded through a die having a rectangular cross-section of about ⅜ × ⅞ inch onto a moving strip of silicone release paper about 1 ¾ inches wide. The resulting tape is wound about a cardboard mandrel to form a flat coil. The material as applied remains doughy and tacky indefinitely at room temperature. After application it need not be cured to serve its heat transfer function. However, in use it will become heated and eventually cured. The rate of cure depends upon temperature, ranging from about 48 hours at 212°F. to about ½ hour at 400°F.

Modification is possible in the selection of the materials and amounts thereof used in preparing the product of the present invention as well as in the particular techniques employed without departing from the scope of the invention.

What is claimed is:

1. A heat transfer product in preshaped tape form comprising strippably adhered to a backing release sheet, a heat curing plastic, elongate composition, the composition consisting essentially of an intimate mixture of particulate solids having a thermal conductivity of at least 100 BTU/inch/hr./sq.ft./deg.F. in an amount of from about 15 to about 60 percent; epoxy resin present in an amount from about 15 to about 40 percent; dicyandiamide present in an amount of from about 1 to about 15 parts per hundred of epoxy resin; nitrile rubber present in an amount of from about 2 to about 15 percent; polybutene present in an amount of from about 2 to about 15 percent; and asbestos fiber present in an amount of from about 3 to about 10 percent; said percentages being by weight based upon the weight of the composition.

2. The product of claim 1 wherein the stated components are present within the following ranges: particulate solids from about 35 to about 45 percent; epoxy resin from about 25 to about 30 percent; dicyandiamide from about 4 to about 6 parts per hundred parts epoxy resin; nitrile rubber from about 5 to about 10 percent; polybutene from about 10 to about 15 percent; and asbestos fiber from about 4 to about 8 percent.

3. The product of claim 1 wherein said particulate solids are essentially graphite.

4. The product of claim 3 wherein said graphite is electrode grade graphite.

5. The product of claim 3 wherein said graphite is size graded for improved packing density in the composition.

6. The product of claim 5 wherein said graphite is made up of relatively coarse particles, substantially all through 20 mesh but less than 25 percent through 200 mesh, and of relatively fine particles, more than 75 percent through 200 mesh, the relatively coarse particles making up from about 5 to about 40 percent of the composition and the relatively fine particles making up from about 5 to about 40 percent of the composition.

7. The product of claim 1 wherein said epoxy resin is a liquid reaction product of epichlorhydrin and bisphenol A.

8. The product of claim 3 wherein said epoxy resin is a liquid reaction product of epichlorhydrin and bisphenol A.

9. The product of claim 4 wherein said epoxy resin is a liquid reaction product of epichlorhydrin and bisphenol A.

10. The product of claim 5 wherein said epoxy resin is a liquid reaction product of epichlorhydrin and bisphenol A.

11. The product of claim 6 wherein said epoxy resin is a liquid reaction product of epichlorhydrin and bisphenol A.

12. The product of claim 2 wherein said particulate solids are essentially graphite, and wherein said epoxy resin is a liquid reaction product of epichlorhydrin and bisphenol A.

13. The product of claim 12 wherein said graphite is electrode grade graphite.

14. The product of claim 13 wherein said graphite is made up of relatively coarse particles, substantially all through 20 mesh but less than 25 percent through 200 mesh, and of relatively fine particles, more than 75 percent through 200 mesh, the relatively coarse particles making up from about 10 to about 20 percent of the composition and the realtively fine particles making up from about 20 to 30 percent of the composition.

15. The product of claim 1 wherein said asbestos fiber is chrysotile.

16. The product of claim 4 wherein said asbestos fiber is chrysotile.

17. The product of claim 7 wherein said asbestos fiber is chrysotile.

18. The product of claim 14 wherein said asbestos fiber is chrysotile.

* * * * *